United States Patent [19]
Gschwind et al.

[11] Patent Number: 5,554,905
[45] Date of Patent: Sep. 10, 1996

[54] PIEZOELECTRIC ROTATING MOTOR

[75] Inventors: Michel Gschwind, Grasse; Tatsumi Mitsuta, Cagnes sur Mer; Daniel Guyomar, Nice; Jean-Denis Sauzade, Grasse; Thierry Mazoyer, Vence, all of France

[73] Assignees: IMRA Europe SA; Techsonic, both of Valbonne, France

[21] Appl. No.: 384,335

[22] Filed: Feb. 1, 1995

[30] Foreign Application Priority Data

Feb. 1, 1994 [FR] France .................................. 94 01069

[51] Int. Cl.$^6$ ........................................................ H01L 41/08
[52] U.S. Cl. ............................................. 310/323; 310/328
[58] Field of Search ........................................ 310/323, 328

[56] References Cited

U.S. PATENT DOCUMENTS

| | | | |
|---|---|---|---|
| 4,562,374 | 12/1985 | Sashida ................................... | 310/323 |
| 4,950,135 | 8/1990 | Tojo et al. ............................. | 310/323 X |
| 5,410,204 | 4/1995 | Imabayashi et al. .................... | 310/323 |

FOREIGN PATENT DOCUMENTS

| | | | |
|---|---|---|---|
| 2690018 | 10/1993 | France . | |
| 1-117671 | 1/1989 | Japan . | |
| 0262875 | 10/1990 | Japan ..................................... | 310/323 |
| 0135380 | 6/1991 | Japan ..................................... | 310/323 |

OTHER PUBLICATIONS

Abstract of JP-A-01-243860, *Patent Abstracts of Japan*, vol. 013, No. 581 (1989).
Abstract of JP-A-63-262071, *Patent Abstracts of Japan*, vol. 013, No. 081 (1989).
Abstract of JP-A-63-089074, *Patent Abstracts of Japan*, vol. 012, No. 324 (1988).

*Primary Examiner*—Mark O. Budd
*Attorney, Agent, or Firm*—Oliff & Berridge

[57] ABSTRACT

A piezoelectric rotating motor includes a plurality of piezoelectric elements, a disk-shaped stator having a center portion in which the piezoelectric elements are accommodated, a circular friction zone which is formed on an outer peripheral portion of its one surface and a connecting portion which connects the center portion with the friction zone so as to form a lever transmitting and amplifying the axial strain of the piezoelectric elements to the portion of the friction zone located in the same angular sector as the piezoelectric elements and which has a cone shape at rear side of the friction zone so as to thin its thickness from the center portion to the outer peripheral portion and producing a progressive wave forming an elliptical vibration on the friction zone by the composition of its three dimensional strain due to the piezoelective effect of the piezoelectric elements and a rotor being contracted with the friction zone under pressure.

12 Claims, 3 Drawing Sheets

PIEZOELECTRIC ROTATING MOTOR

BACKGROUND OF THE INVENTION

1. Field of the Invention

The present invention relates to a piezoelectric rotating motor which generates the mechanical power by the utilization of ultrasonic vibrations generated by the piezoelective effect of piezoelectric elements.

2. Description of the Prior Art

Piezoelectric rotating motors arc made up of a stationary part, or stator, and of a rotating part, or rotor. The stator and the rotor contact with each other under pressure along circular friction zones which are positioned at their peripheral portions. Piezoelectric elements are arranged in the vicinity of the friction zone of the stator. For example, the piezoelectric elements of the piezoelectric rotating motor disclosed in U.S. Pat. No. 4,562,374 are fixed to the lower face of the stator which is formed the circular friction zone at its upper face, by adhesives and so on. High-frequency voltages with proper different phase are applied to each of these piezoelectric elements, respectively and thereby a progressive wave forming an elliptical vibration is produced on the friction zone by ultrasonic vibrations of the piezoelectric elements. This progressive wave is amplified by comb-shaped teeth which are formed on the friction zone and drives the rotor by the frictional force. Thereby, the mechanical power is obtained as a rotational force of the rotor. The piezoelectric rotating motors have the advantage, in particular, of providing a high torque with a low rotational speed.

In the above prior motors, however, the power of motors is limited by the fact that the piezoelectric elements are likely to break if subjected to excessive bending. Furthermore, the motors undergo many energy losses due to rubbing, leading in addition to overheating that are harmful to the good working of the piezoelectric elements.

A piezoelectric rotating motor which overcomes the above drawbacks is proposed by Japanese patent application laid-open publication No. 1(1989)-117671. In this motor, ring-shaped piezoelectric elements are sandwiched between a base plate and a disk-shaped stator having a diameter which is larger than that of the piezoelectric elements. A friction zone is formed on an outer peripheral portion of the stator which is outwardly apart from the piezoelectric elements in the diametrical direction. According to this motor, it is able to overcome the above drawbacks and furthermore it is possible to produce a large amplitude on the friction zone, because the amplitude of the piezoelectric elements is amplified by the leverage.

In the above prior piezoelectric rotating motor, however, since the thickness of the stator is uniformity, the vibration energy of the piezoelectric elements is apt to transmit inward in the diametrical direction and it is not able to effectively transmit the vibration energy of the piezoelectric elements to the friction zone. This is remarkable, when the rotor is contacted with the friction zone under pressure.

SUMMARY OF INVENTION

It is, therefore, an object of the present invention to provide an improved piezoelectric rotating motor which overcomes the above drawbacks.

It is another object of the present invention to provide an improved piezoelectric rotating motor which can effectively transmit the vibration energy of the piezoelectric elements to the friction zone, so that it is able to generate high power.

In order to achieve these objectives, there is provided a piezoelectric rotating motor which includes a plurality of piezoelectric elements, a disk-shaped stator having a center portion in which the piezoelectric elements are accommodated, a circular friction zone which is formed on an outer peripheral portion of its one surface and a connecting portion which connects the center portion with the friction zone so as to form a lever transmitting and amplifying the axial strain of the piezoelectric elements to the portion of the friction zone located in the same angular sector as the piezoelectric elements and which has a cone shape at rear side of the friction zone so as to thin its thickness from the center portion to the outer peripheral portion and producing a progressive wave forming an elliptical vibration on the friction zone by the composition of its three dimensional strain due to the piezoelective effect of the piezoelectric elements and a rotor being contacted with the friction zone under pressure.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A piezoelecrtric rotating motor constituted in accordance with preferred embodiments of the present invention will be described with reference to attached drawings.

Figure 1:
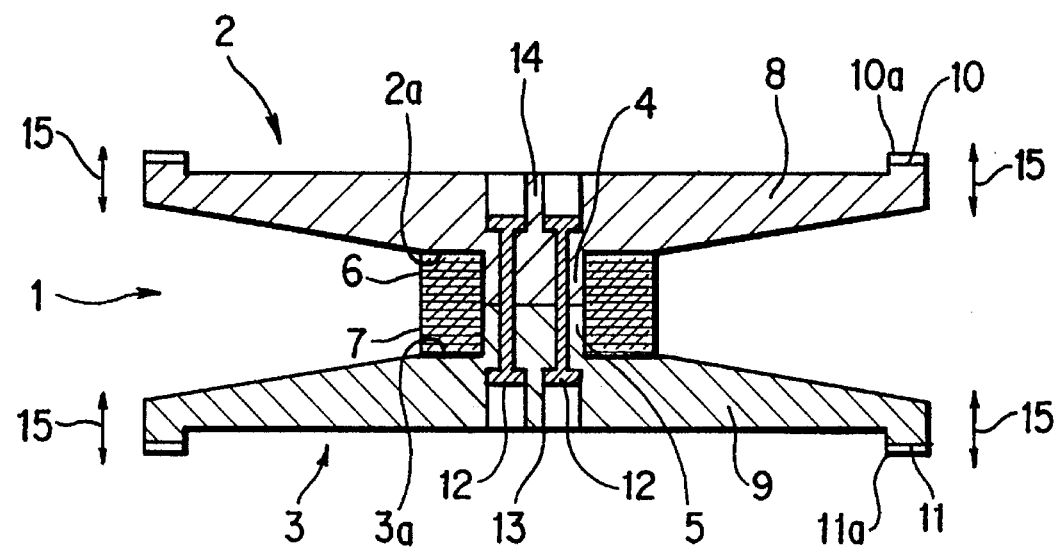
FIG. 1 is a sectional view of a set unit of stators and piezoelectric elements showing a first embodiment of a piezoelectric rotating motor in accordance with the present invention.
Figure 2:
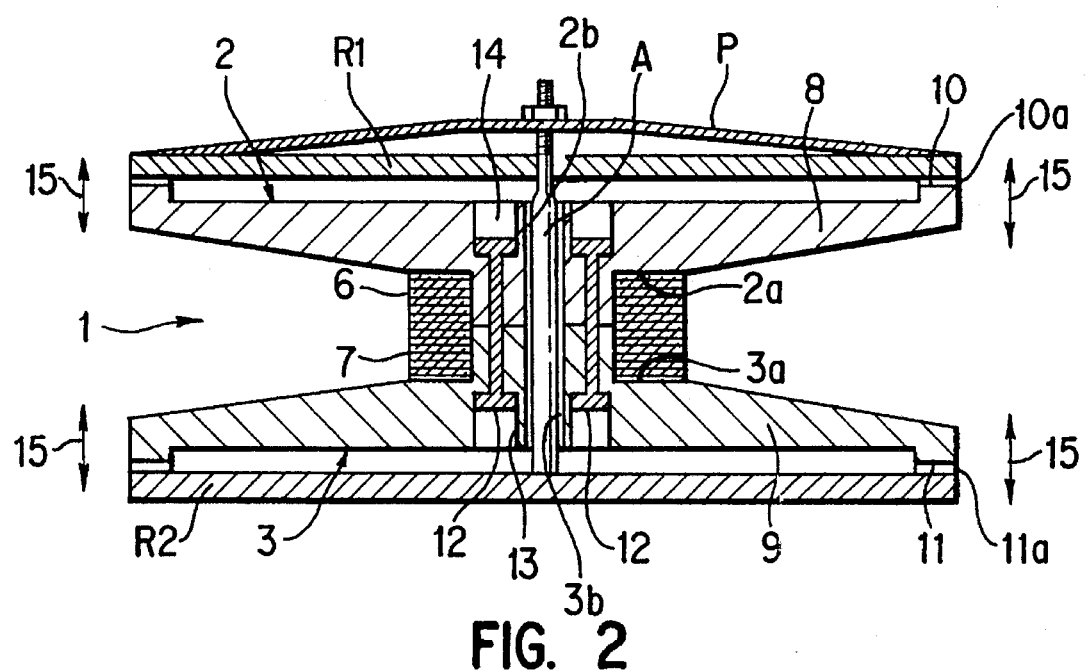
FIG. 2 is a sectional view of a piezoelectric rotating motor including a set unit of FIG. 1.

FIG. 1 and FIG. 2 show a first embodiment of a piezoelectric rotating motor in accordance with the present invention. In FIG. 1, stators 2, 3 and a plurality of piezoelectric elements 6, 7 of a piezoelectric rotating motor 1 are shown therein. Each of the stators 2, 3 is made of an iron alloy, an aluminum alloy, a copper or a ceramic material and so on and has a disk shape. The stator 2, 3 are provided with thick columned center portions 4, 5 which are formed at their axial center and which are projected to one side, respectively.

Circular flat surfaces 2a, 3a are formed around the base portions of the center portions 4, 5, respectively. The portions which extend from the outer fringe portions of these circular flat surfaces 2a, 3a to the outer peripheral portions of the stators 2, 3 have a cone shape so as to thin its thickness gradually and so as to be convexly at the side of the center portions 4, 5. Thereby, the vibration energies of the piezoelectric elements 6, 7 are effectively transmitted to the outer peripheral portions of the stators 2, 3, as mentioned later. On the other side of each of the stators 2, 3, a flat surface is formed thereon and circular friction zones 10, 11 which contact with rotors mentioned later under pressure are formed on outer peripheral portions of the flat surfaces, respectively. Each of these friction zone 10, 11 is covered with a lay of friction material resistant to wear. Dish-shaped connecting parts between the friction zones 10, 11 and the center portions 4, 5 correspond to connecting portions 8, 9 of the present invention, respectively. The stators 2, 3 are fixed each other by coupling devices 12 such as bolts penetrating the center portions, 4, 5 so as to oppose the center portions 4, 5 and so as to be a butterfly-shape.

In this embodiment, 12 or 16 pieces of the piezoelectric elements (6, 7 (total, 24 or 36 pieces) are sandwiched between the circular flat surfaces 2a, 3a without using the adhesives, respectively. Each of the piezoelectric elements 6, 7 has a columned shape and is formed by the stacking of a plurality of ceramics. The piezoelectric elements 6, 7 are coaxially positioned, respectively and these 12 or 16 pieces of the piezoelectric elements 6, 7 are circularly arranged at regular intervals along the circular flat surfaces 2a, 3a. These piezoelectric elements 6, 7 are axially prestressed by the adjusting of the coupling devices 12 so as to work in compression. This allows to benefit from the fact that piezoelectric elements have a higher resistance to compression than to traction. Furthermore, the piezoelectric element formed by the stacking of a plurality of ceramics can obtain a larger elongation than a monolithic ceramics having the same size. The piezoelectric elements 6, 7 bear pressure on the friction zone 10, 11 of the stators by holding the latter pressed against rotors.

The piezoelectric elements 6, 7 are connected with an electric source (not shown) and voltages having sin, −sin, cos, −cos wave forms are applied to each pair of the piezoelectric elements 6, 7 which are coaxially positioned in an alternate manner so as to be given a phase difference of quarter of a wavelength between two voltages applied to two adjacent pairs of piezoelectric elements 6, 7 each other.

FIG. 2 shows the piezoelectric rotating motor 1 which includes a set unit of the stators 2, 3 and the piezoelectric elements 6, 7 assembled as mentioned above. In FIG. 2, holes 2b, 3b are coaxially formed at the center portions 4, 5 of the stators 2, 3, respectively and a shaft A is loosely fitted into the holes 2b, 3b. An one end of the shaft A is fixed to a center of a disk-shaped rotor R2 which contacts with the friction zone 11 of the stator 3. The other end of the shaft A penetrates a hole formed at a center of a disk-shaped rotor R1 which contacts with the friction zone 10 of the stator 2 and is screwed up through a plate spring P. Thereby, the rotors R1, R2 are pressed to the friction zones 10, 11 of the stators 2, 3.

The above-described first embodiment of the piezoelectric rotating motor 1 operates as follows:

When the above different voltages are applied to each pair of the piezoelectric elements 6, 7 which are coaxially positioned, the axial strains of the piezoelectric elements 6, 7 are repeated and the piezoelectric elements 6, 7 vibrate. In the regions 13, 14 located in the vicinity of the coupling devices 12, the stators 2, 3 (the connecting portions 8, 9) is likely to axially bend slightly to act as a lever (or one fixed beam). Thereby, the axial strains of the piezoelectric elements 6, 7 become waves progressing in the circumferential and diametrical directions and are transmitted to the portions of the friction zones 10, 11 located in the same angular sector as each pair of the piezoelectric elements 6, 7 while being amplified through the connecting portions 8, 9, respectively. As a result, axial strains are generated at the friction zones 10, 11 as shown by numeral 15 in FIG. 1 and FIG. 2 and progressive waves forming an elliptical vibration are produced on the friction zones 10, 11 in the circumferential direction, respectively. These progressive waves let the rotors R1, R2 rotate toward same direction and thereby the mechanical power is generated as a rotational power through an output shaft (not shown) which is fixed to the rotor.

As mentioned above, according to this embodiment, since the vibration energy of each the piezoelectric elements 6, 7 is effectively transmitted to each of the friction zones 10, 11 having thin thickness without being transmitted to each of the center portions 4, 5 by each of the cone-shaped connecting portions 8, 9 which functions as a lever, it is able to produce a sufficiently large strain (amplitude) by the limited elongation of the piezoelectric elements 6, 7. Furthermore, the bending stress is not acted on the piezoelectric elements 6, 7. Accordingly, it is able to improve the power of the piezoelectric rotating motor without concerning about the destruction of the piezoelectric elements. Furthermore, since the heats due to the rubbing of the friction zones 10, 11 are only slightly transmitted to the piezoelectric elements 6, 7 which are accommodated in the center portions 4,5 connected with the friction zones 10, 11 through the connecting portions 8, 9, respectively, it is able to maintain the working of the piezoelectric elements under the good thermal condition.

Furthermore, since the piezoelectric elements work in traction-compression, it is able to get more power and it is able to work with higher voltages. Furthermore, since the piezoelectric elements are installed without using the adhesives, the piezoelectric rotating motor in accordance with this embodiment is excellent in durability and it is able to reduce the manufacturing cost.

In the above piezoelectric rotating motor having iron stators 2, 3 of diameter 50 mm, it is confirmed that the amplitude of the piezoelectric elements 6, 7 of 1 μm is amplified to the amplitude of the friction zones 10, 11 of about 10 μm and that the power of 5 W is generated.

Figure 3:
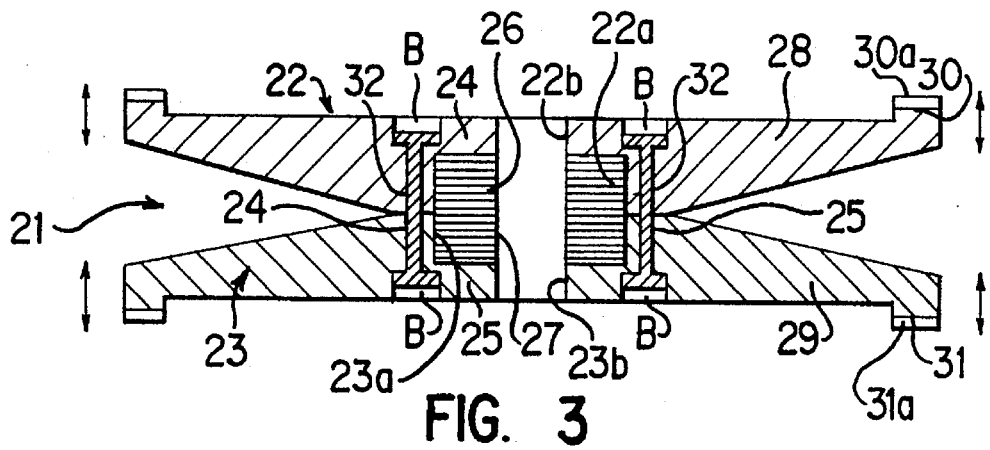
FIG. 3 is a sectional view of a set unit of stators and piezoelectric elements showing a second embodiment of a piezoelectric rotating motor in accordance with the present invention.
Figure 4:
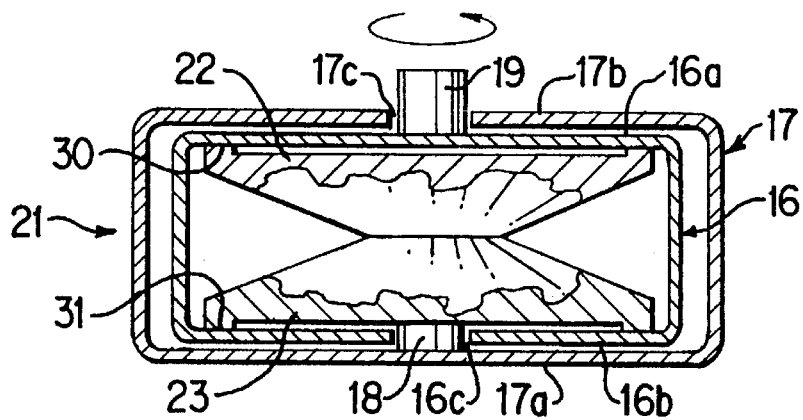
FIG. 4 is a sectional view of a piezoelectric rotating motor including a set unit of FIG. 3.

FIG. 3 and FIG. 4 show a second embodiment of the present invention. In FIG. 3 and FIG. 4, the same parts as compared with FIG. 1 and FIG. 2 are identified by the reference numerals which 20 is added to that used in FIG. 1 and FIG. 2. In this embodiment, the position of the piezoelectric elements 26, 27 with regard to the coupling devices 32 is different from the above first embodiment. Furthermore, each of the stator 22, 23 made of the same material as the stator 2, 3 of the first embodiment has a cone shape so as to be convexly toward one side and a flat surface is formed on each of end portions of the convex side. Columned portions whose sections are these flat surface and which extend axially correspond to center portions 24, 25 of the present invention, respectively. On the other side of each of the stators 22, 23, a flat surface is formed thereon and circular friction zones 30, 31 which contact with rotors mentioned later under pressure are formed on outer peripheral portions of the flat surfaces, respectively. Each of these friction zone 30, 31 is covered with a lay of friction material resistant to wear. Dish-shaped connecting parts between the friction zones 30, 31 and the center portions 24, 25 correspond to connecting portions 28, 29 of the present invention, respectively.

At an axial center of each of the center portions 24, 25, namely, at an axial center of each of the stators 22, 23, holes 22b, 23b extending axially are formed, respectively. At the ends of the holes 22b, 23b of the convex side, circular grooves 22a, 23a which extend axially are formed, respectively. The stators 22, 23 are fixed each other by coupling devices 32 such as bolts penetrating the center portions 24, 25 so as to oppose the center portions 24, 25 and so as to be a butterfly-shape.

In this embodiment, 12 or 16 pieces of the piezoelectric elements 26, 27 (total, 24 or 36 pieces) are sandwiched between the circular grooves 22a, 23a of the center portions 24, 25 without using the adhesives, respectively. These 12 or 16 pieces of the piezoelectric elements 26, 27 are circularly arranged at regular intervals along the circular grooves 22a, 23a. Since each of these piezoelectric elements 26, 27 is constituted in same way as the above mentioned first embodiment, the description is omitted.

FIG. 4 shows the piezoelectric rotating motor 21 which includes a set unit of the stators 22, 23 and the piezoelectric elements 26, 27 assembled as mentioned above. In FIG. 4, the stator 22, 23 are accommodated in a cylindrical rotor 16 which is closed at its both ends and the closed end surfaces 16a, 16b of the rotor 16 are contacted with the friction zones 30, 31 under pressure, respectively. A shaft 18 fixed into the holes 22b, 23b. An one end of the shaft 18 which is projected from the stator 23 is loosely fitted into a hole 16c formed on the closed end surface 16b and is fixed to one end surface of a case 17. The case 17 has a closed cylindrical shape so as to accommodate the rotor 16 therein and is provided with a hole 17c at its other end surface. An output shaft 19 which is fixed to the closed end surface 16a of the rotor 16 is loosely fitted into the hole 17c.

The above-described second embodiment of the piezoelectric rotating motor 21 operates as follows:

When the different voltages are applied to each pair of the piezoelectric elements 26, 27 which are coaxially positioned as same as the above mentioned first embodiment, the axial strains of the piezoelectric elements 26, 27 are repeated and the piezoelectric elements 26, 27 vibrate. In the regions B located in the vicinity of the coupling devices 32, the stators 22, 23 (the connecting portions 28, 29) is likely to axially bend slightly to act as a lever (or one fixed beam). Thereby, the axial strains of the piezoelectric elements 26, 27 become waves progressing in the circumferential and diametrical directions and are transmitted to the portions of the friction zones 30, 31 located in the same angular sector as each pair of the piezoelectric elements 26, 27 while being amplified through the connecting portions 28, 29, respectively. As a result, axial strains are generated at the friction zones 30, 31 as shown arrows in FIG. 3 and FIG. 4 and progressive waves forming an elliptical vibration are produced on the friction zones 30, 31 in the circumferential direction, respectively. These progressive waves let the rotor 16 rotate toward same direction by the frictional force between the friction zone 30, 31 and the closed end surfaces 16a, 16b of the rotor 16 and thereby the mechanical power is generated as a rotational power through an output shaft 19 which is fixed to the rotor 16.

Figure 5:
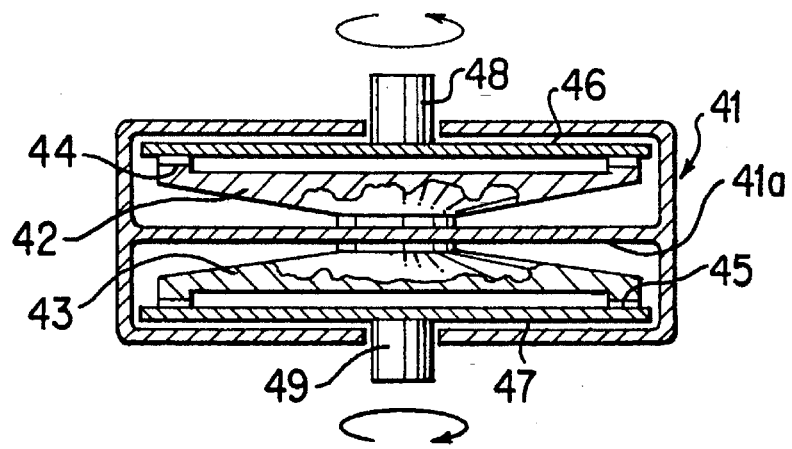
FIG. 5 is a sectional view of a third embodiment of a piezoelectric rotating motor in accordance with the present invention.

FIG. 5 shows a third embodiment of the present invention. In this embodiment, the stators 42, 43 are not fixed each other, but fixed to a partition portion (a base member) 41a of a case 41. Although the details are not shown in FIG. 5, each of the piezoelectric elements is accommodated in each of the center portions of the stators 42, 43 in same way as the above mentioned embodiments and each of the stators 42, 43 is fixed to the partition portion 41a in such a way that the piezoelectric elements are axially prestressed. Disk-shaped rotors 46, 47 are contacted with friction zones 44, 45 of the stators 42, 43 under pressure and output shafts 48, 49 are fixed on axial centers of the rotors 46, 47, respectively.

The case 41 has a closed cylindrical shape and an inner area of the case 41 is divided into two areas by the partition portion 41a so that the stators 42, 43 and the rotors 46, 47 are accommodated in the areas, respectively. Holes in which the output shaft 48, 49 are loosely fitted are formed on the closed end surfaces of the case 41, respectively.

In this embodiment, progressive wave forming an elliptical vibration is produced on each of the friction zones 44, 45 by the axial strain of the piezoelectric elements in same way as the above mentioned embodiments. These progressive waves let the rotor 46, 47 rotate by the frictional force between the friction zone 44, 45 and the rotors 46, 47 and thereby the mechanical power is generated as a rotational power through the output shaft 48, 49. This embodiment is different from the above embodiments and the friction zones 44, 45 undergo independent strains of the piezoelectric elements. Therefore, it is able to produce two progressive waves on the friction zones 44, 45 in opposite direction by the changing of the wave form of the applied voltages, respectively and it is able to obtain two rotational forces whose rotational directions are reverse each other.

In the above mentioned three embodiments, the present invention is applied to a piezoelectric rotating motor which includes two stators. However, it is possible to apply the present invention to other type of piezoelectric rotating motors, for example a piezoelectric rotating motor which includes one stator as one side of the stators shown in FIG. 5.

Figure 6:
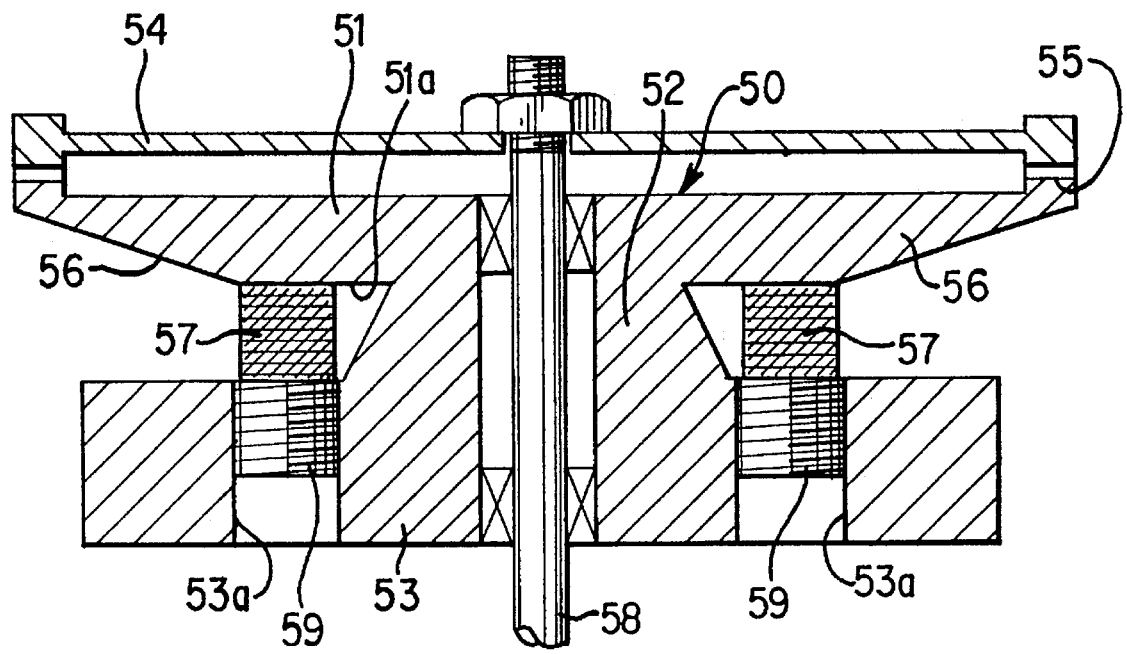
FIG. 6 is a sectional view of a fourth embodiment of a piezoelectric rotating motor in accordance with the present invention.

FIG. 6 shows a fourth embodiment of the present invention. In FIG. 6, a stator 50 includes a disk-shaped stator portion 51. The stator 50 is provided with a thick columned center portion 52 which is formed at an axial center of the stator portion 51 and which are projected to one side. In this embodiment, a base portion 53 is formed on an end of the center portion 52 in one body. The center portion 52 tapers off to the stator portion 51. Namely, the part of the center portion 52 which is connected with the base portion 53 has a larger diameter than that connected with the stator portion 51.

Circular flat surface 51a is formed around the base portion of the center portion 52 which is connected with the stator portion 51. The part which extends from the outer fringe portion of the circular flat surface 51a to the outer peripheral portion of the stator portion 51 have a cone shape so as to thin its thickness gradually and so as to be convexly at the side of the center portion 52. Thereby, the vibration energies of the piezoelectric elements mentioned later are effectively transmitted to the outer peripheral portion of the stator portion 51. On the other side of each of the stator portion 51, a flat surface is formed thereon and circular friction zone 55 which contacts with rotor 54 under pressure are formed on outer peripheral portion of the flat surface. The friction zone 55 is covered with a lay of friction material resistant to wear. Dish-shaped connecting part between the friction zone 55 and the center portion 52 corresponds to a connecting portion 56 of the present invention. The base portion 53 is fixed to a stationary member (not shown).

At a circular part of the base portion 53 which is opposite to the circular flat surface 51a, 12 or 16 pieces of holes 53a are formed at regular intervals. Screws 59 are screwed into the hole 53a toward the stator portion 51 and 12 or 16 pieces of piezoelectric elements 57 which are constituted in same way as the above mentioned embodiments are sandwiched between the head surfaces of the screws 59 and the circular flat surface 51a, respectively. Each of these 12 or 16 pieces of piezoelectric elements 57 is axially prestressed uniformly by each of the screws 59.

When the different voltages are applied to each of the piezoelectric elements 57 in same way as the above mentioned embodiments, the axial strains of the piezoelectric elements 57 are repeated and the piezoelectric elements 57 vibrate. In the regions located in the vicinity of the piezoelectric elements 57, the stator portion 51 (the connecting portion 56) is likely to axially bend slightly to act as a lever (or one fixed beam). Thereby, the axial strains of the piezoelectric elements 57 become waves progressing in the circumferential and diametrical directions and are transmitted to the portion of the friction zone 55 located in the same angular sector as each of the piezoelectric elements 57 while being amplified through the connecting portion 56, respectively. At this time, since the center portion 52 and the base portion 53 are thick and the center portion 52 tapers off as mentioned above, the vibration energies of the piezoelectric elements 57 are effectively transmitted to the thin friction zone 55 without being transmitted to the center portion 52 and the base portion 53. As a result, axial strains are generated at the friction zone 55 and a progressive wave forming an elliptical vibration is produced on the friction zone 55 in the circumferential direction. The progressive wave let the rotor 54 rotate and thereby the mechanical power is generated as a rotational power through an output shaft 58 which is fixed to the rotor 54 and which is rotatably supported on the stator 50 through bearings.

As mentioned above, according to the present invention, since the vibration energies of the piezoelectric elements are effectively transmitted to the thin friction zone without being transmitted to the thick center portion by the cone-shaped connecting portion which functions as a lever, it is able to produce a sufficiently large strain (amplitude) on the friction zone by the limited elongation of the piezoelectric elements. Furthermore, the bending stress is not acted on the piezoelectric elements. Accordingly, it is able to improve the power of the piezoelectric rotating motor without concerning about the destruction of the piezoelectric elements.

Furthermore, according to the present invention, if the piezoelectric elements are accommodated between two stators having a cone-shaped connecting portion which functions as a lever, it is able to utilize the vibration energies which are produced from both ends of the piezoelectric elements and therefore it is able to improve the power of the piezoelectric rotating motor.

Furthermore, since the heats due to the rubbing of the friction zone are only slightly transmitted to the piezoelectric elements which are accommodated in the center portion connected with the friction zone through the connecting portion, it is able to maintain the working of the piezoelectric elements under the good thermal condition. Furthermore, since the special mechanically process of the stator is not required for amplifying of the strain of the piezoelectric elements, it is able to reduce the manufacturing cost of the piezoelectric rotating motor.

What is claimed is:

1. A piezoelectric rotating motor comprising:
   a plurality of piezoelectric elements;
   a disk-shaped stator having a center portion in which the piezoelectric elements are accommodated, a circular friction zone which is formed on an outer peripheral portion of its one surface and a connecting portion which connects the center portion with the friction zone so as to form a lever transmitting and amplifying the axial strain of the piezoelectric elements to the portion of the friction zone located in the same angular sector as the piezoelectric elements and which has a cone shape at a rear side of the friction zone so as to thin its thickness from the center portion to the outer peripheral portion and producing a progressive wave forming an elliptical vibration on the friction zone by the composition of its three dimensional strain due to the piezoelective effect of the piezoelectric elements; and
   a rotor being contacted with the friction zone under pressure.

2. A piezoelectric rotating motor as recited in claim 1, wherein the piezoelectric elements are axially prestressed and are accommodated in the center portion of the stator.

3. A piezoelectric rotating motor as recited in claim 1, wherein each of the piezoelectric elements is formed by the stacking of a plurality of ceramics.

4. A piezoelectric rotating motor as recited in claim 1, wherein the piezoelectric rotating motor includes a pair of the stators and the stators are coupled to each other at their center portions so as to sandwich the piezoelectric elements therebetween, and wherein the friction zone is formed on each of the surfaces of the stators which are not opposite each other.

5. A piezoelectric rotating motor as recited in claim 4, wherein the rotor has a cylindrical shape having both closed end portions and the closed end portions are contacted with the friction zones under pressure, respectively.

6. A piezoelectric rotating motor as recited in claim 1, wherein the piezoelectric rotating motor includes a pair of the stators and each of the stators is fixed to a base member at its center portion so as to sandwich the piezoelectric elements therebetween, and wherein a pair of the rotors being independent of each other are contacted with the friction zones formed on the surfaces of the stators which are not opposite each other under pressure, respectively.

7. A piezoelectric rotating motor comprising;
   a stator including a pair of disk members each of which has a thick portion and a thin portion at its center and peripheral portion, respectively and which are disposed so as to be opposite the thick portions each other,
   a plurality of piezoelectric elements accommodated in grooves which are formed on the thick portions, and
   a rotor contacted with a friction zone which is formed on the peripheral portion of the stator,
   wherein each of the opposite surfaces of a pair of the disk members has a cone shape so as to thin its thickness from the thick portion to the peripheral portion.

8. A piezoelectric rotating motor as recited in claim 7, wherein the stator is made of one of an iron alloy, an aluminum alloy, a copper or a ceramic material and amplifies the vibration of the piezoelectric elements 5 to 10 times.

9. A piezoelectric rotating motor as recited in claim 7, wherein a groove which opens toward the opposite side of the rotor is formed on the center portion and the piezoelectric elements are accommodated in the groove so as to be sandwiched between the stator and a base member which is fixed to the center portion.

10. A piezoelectric rotating motor as recited in claim 9, wherein the base member is formed on the stator in one body.

11. A piezoelectric rotating motor as recited in claim 1, wherein the center portion has a first diameter and the friction zone has a second diameter that is different than the first diameter.

12. A piezoelectric rotating motor as recited in diameter claim 11, wherein the second diameter is greater than the first diameter.

* * * * *